United States Patent
Avtamonov et al.

(10) Patent No.: US 9,596,704 B2
(45) Date of Patent: Mar. 14, 2017

(54) INITIATING AND MONITORING WIRELESS CONNECTION BETWEEN STATION AND ACCESS POINT

(71) Applicant: ARRIS Enterprises, Inc., Suwanee, GA (US)

(72) Inventors: Anton Avtamonov, Sugar Hill, GA (US); Charles Hardt, Lawrenceville, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/747,168

(22) Filed: Jun. 23, 2015

(65) Prior Publication Data

US 2015/0382383 A1  Dec. 31, 2015

Related U.S. Application Data

(60) Provisional application No. 62/018,003, filed on Jun. 27, 2014.

(51) Int. Cl.
*H04W 76/02* (2009.01)
*H04W 12/08* (2009.01)
*H04W 84/12* (2009.01)
*H04W 88/02* (2009.01)

(52) U.S. Cl.
CPC .......... *H04W 76/02* (2013.01); *H04W 12/08* (2013.01); *H04W 84/12* (2013.01); *H04W 88/021* (2013.01)

(58) Field of Classification Search
CPC ... H04W 76/02; H04W 12/08; H04W 76/023; H04W 84/12

USPC .................................................. 455/73, 41.2
See application file for complete search history.

(56) References Cited

U.S. PATENT DOCUMENTS

| 2008/0126975 A1 | 5/2008 | Vassigh et al. |
| 2012/0177022 A1 | 7/2012 | Ichikawa |
| 2013/0107796 A1 | 5/2013 | Du et al. |
| 2014/0035464 A1 | 2/2014 | Santos et al. |
| 2014/0319235 A1* | 10/2014 | Leen ............ G05D 23/19 236/1 C |

(Continued)

FOREIGN PATENT DOCUMENTS

| CN | 103428547 A | 12/2013 |
| EP | 2424283 A1 | 2/2012 |
| EP | 2493224 A2 | 8/2012 |

OTHER PUBLICATIONS

Samsung user manual series 5300 LED TV , 2012.*

(Continued)

*Primary Examiner* — Tuan Pham
(74) *Attorney, Agent, or Firm* — Bart A. Perkins

(57) ABSTRACT

Methods, systems, and computer readable media may be operable to facilitate the initiation of a wireless setup between a station and an access point upon the station receiving a predetermined input from a user. The status of a wireless connection between the station and an access point may be displayed to a user through one or more display interfaces or light indicators associated with the station. The methods, systems, and computer readable media described herein allow a user to initiate and monitor a wireless setup between a station and an access point without having to connect a display device to the station.

14 Claims, 5 Drawing Sheets

(56) References Cited

U.S. PATENT DOCUMENTS

2015/0282073 A1* 10/2015 Davidson .......... H04W 52/0209
455/41.2

OTHER PUBLICATIONS

PCT Search Report & Written Opinion, Re: Application No. PCT/US2015/037107; dated Oct. 5, 2015.
"SCX340 User's Guide—Wireless Network Setup", retrieved from the Internet at URL <http://www.samsung.com/hk_en/supportimodel/SCX-3405W/XSS> on Sep. 25, 2015.
D. Coleman, "6.2 Wi-Fi Protected Setup (WPS)" in "CWSP Certified Wireless Security Professional Official: Study Guide", Feb. 17, 2010.

* cited by examiner

INITIATING AND MONITORING WIRELESS CONNECTION BETWEEN STATION AND ACCESS POINT

CROSS REFERENCE TO RELATED APPLICATION

This application is a non-provisional application claiming the benefit of U.S. Provisional Application Ser. No. 62/018,003, entitled "Initiating and Monitoring Wireless Connection Between Set-Top Box and Access Point," which was filed on Jun. 27, 2014, and is incorporated herein by reference in its entirety.

TECHNICAL FIELD

This disclosure relates to initiating and monitoring a wireless connection between devices.

BACKGROUND

It is common that a station installed or otherwise in use at a subscriber premise might not have a dedicated physical button used for initiating a wireless setup or handshake (e.g., WiFi Protected Setup (WPS) handshake) between the station and an access point (e.g., wireless modem, router, gateway, wireless extender, etc.). Users are therefore forced to connect the station to a display device (e.g., television, computer, mobile device, etc.) to guide the wireless setup between the station and an access point. For example, without a dedicated button for initiating a wireless setup, a user or installer might be forced to connect a multiple-systems operator (MSO) owned set-top box (STB), for example, to a subscriber owned television in order to facilitate a wireless setup between the STB and an access point. Typically, the user guides the wireless setup through software controls. Therefore, a need exists for improving methods and systems for initiating and monitoring a wireless connection between a station and an access point.

BRIEF DESCRIPTION OF THE DRAWINGS

Like reference numbers and designations in the various drawings indicate like elements.

DETAILED DESCRIPTION

Figure 1:
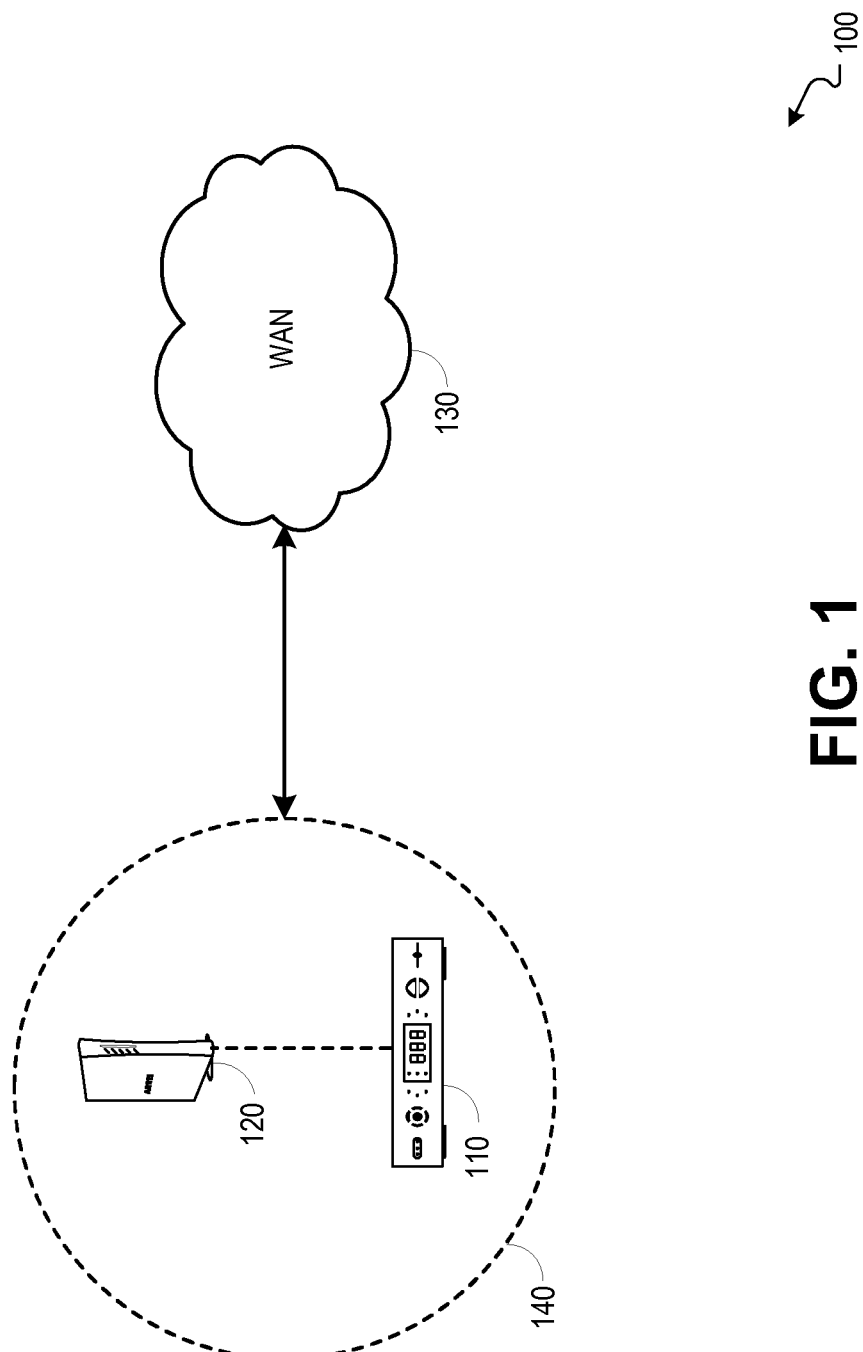
FIG. 1 is a block diagram illustrating an example network environment operable to facilitate the initiation and monitoring of a wireless connection between a station and an access point.

It is desirable to improve upon methods and systems for initiating and monitoring a wireless connection between a station and an access point. Methods and systems are described herein for initiating a wireless setup including a wireless handshake (e.g., a process of establishing parameters for a channel of communication between two or more devices) between a station and an access point upon the station receiving a predetermined input from a user. Further, methods and systems are described herein for displaying to the user, the status of a wireless connection between the station and an access point. The methods and systems described herein allow a user to initiate and monitor a wireless setup between a station and an access point without having to connect a display device to the station.

An embodiment of the invention described herein may include a method comprising: (a) receiving a predetermined input at a station, wherein the predetermined input signals an initiation of a protected setup between the station and an access point; (b) initiating a protected setup process, wherein the protected setup process comprises a plurality of stages; (c) during each respective stage of the plurality of stages of the protected setup process, outputting, at the station, a visual indication associated with the respective stage; (d) determining whether the protected setup process resulted in a successful connection between the station and the access point; and (e) outputting, at the station, a visual indication associated with the result of the protected setup process.

According to an embodiment of the invention, the visual indication associated with each respective stage of the protected setup process comprises a frequency at which a light indicator associated with the station is blinking, wherein the frequency at which the light indicator is blinking is unique to the respective stage.

According to an embodiment of the invention, the method described above may further comprise: (a) if the protected setup process does not result in a successful connection between the station and the access point, identifying a cause of the unsuccessful connection; and (b) wherein the visual indication associated with the result of the protected setup process comprises a sequence of blinking one or more light indicators associated with the station, the sequence being associated with the identified cause of the unsuccessful connection.

According to an embodiment of the invention, the predetermined input comprises a sequence of depressing one or more buttons, and the one or more buttons may be physically located at the station, or may be associated with a remote control unit.

According to an embodiment of the invention, the visual indication associated with each respective stage of the protected setup process comprises text output at a display physically located at the station.

An embodiment of the invention described herein may include an apparatus comprising: (a) a first interface configured to be used to receive a predetermined input, wherein the predetermined input signals an initiation of a protected setup with an access point; (b) a module configured to: (i) initiate a protected setup process, wherein the protected setup process comprises a plurality of stages; and (ii) determine whether the protected setup process results in a successful connection with the access point; and (c) a second interface configured to be used to: (i) during each respective stage of the plurality of stages of the protected setup process, output a visual indication associated with the respective stage; and (ii) output a visual indication associated with the result of the protected setup process.

An embodiment of the invention described herein may include one or more non-transitory computer readable media having instructions operable to cause one or more processors to perform the operations comprising: (a) receiving a predetermined input at a station, wherein the predetermined input signals an initiation of a protected setup between the station and an access point; (b) initiating a protected setup process, wherein the protected setup process comprises a plurality of stages; (c) during each respective stage of the plurality of stages of the protected setup process, outputting, at the station, a visual indication associated with the respective stage; (d) determining whether the protected setup process resulted in a successful connection between the station and the access point; and (e) outputting, at the station, a visual indication associated with the result of the protected setup process.

FIG. 1 is a block diagram illustrating an example network environment 100 operable to facilitate the initiation and monitoring of a wireless connection between a station and an access point. In embodiments, one or more customer premise equipment (CPE) devices (e.g., station 110, access point 120, and other devices that are not shown) may provide video and/or data services to a subscriber by communicating with a wide area network (WAN) 130 through a connection to a network 140 (e.g., a local area network (LAN), a wireless local area network (WLAN), a personal area network (PAN), etc.). The station 110 may include a set-top box (STB), computer, mobile device, tablet, or any other device operable to communicate wirelessly with an access point. The access point 120 may include a modem, a wireless router including an embedded modem, a wireless network extender or any other device operable to deliver data and/or video services from the WAN 130 to the station 110.

In embodiments, an access point 120 can communicate with a station 110 over a wired or a wireless connection. A wireless connection between the station 110 and access point 120 may be established through a protected setup sequence (e.g., WPS). The protected setup sequence may include the steps of scanning multiple wireless channels for an available access point, exchanging one or more messages between a station and access point, exchanging key messages (e.g., pre-shared key (PSK)) between the station and access point, and installing a key (e.g., PSK) at the station. A wireless handshake (e.g., a process of establishing parameters for a channel of communication between two or more devices) between the station 110 and the access point 120 can be initiated at the station 110, and the wireless handshake may be initiated as part of a protected setup between the station 110 and access point 120. In embodiments, the station 110 can begin a wireless protected setup with the access point 120 when the station 110 receives a predetermined input from a user. For example, when the station 110 includes physical buttons (e.g., "Channel Up/Down," "Power On/Off," etc.), the predetermined input may be a sequence of pressing the physical buttons at the station 110. As another example, a remote control associated with the station 110 may be used to enter a predetermined input for initiating a wireless setup with the access point 120.

In embodiments, the input sequence may be based upon an order of buttons to depress and/or a predetermined period of time for which one or more buttons are to be depressed (e.g., the sequence can be: hold the "Power On/Off" button for five (5) or more seconds, release the "Power On/Off" button, then press the "Power On/Off" button two more times, then press the "Channel Up/Down" button). In embodiments, the button sequence for initiating the wireless setup can be defined within the station 110 static configuration file, and the button sequence can be altered by a user. In embodiments, the sequence can include one or more buttons that are rarely used on an associated remote control.

In embodiments, a user can monitor the progress of an attempt to establish a connection between the station 110 and access point 120 through a display or light indicators on the station 110. For example, where the station 110 comprises a display, text and/or graphics indicating the various stages of the wireless setup (e.g., "Handshake Initiated," "Connecting," "Handshaking," "Success," etc.) between the station 110 and access point 120 can be output through the display. As another example, where the station 110 comprises light indicators (e.g., light-emitting diode (LED) indicators), the various stages of the wireless setup between the station 110 and the access point 120 can be indicated based upon which of the one or more light indicators are illuminated and/or the frequency and/or duration for which the one or more light indicators are blinking.

Figure 2:
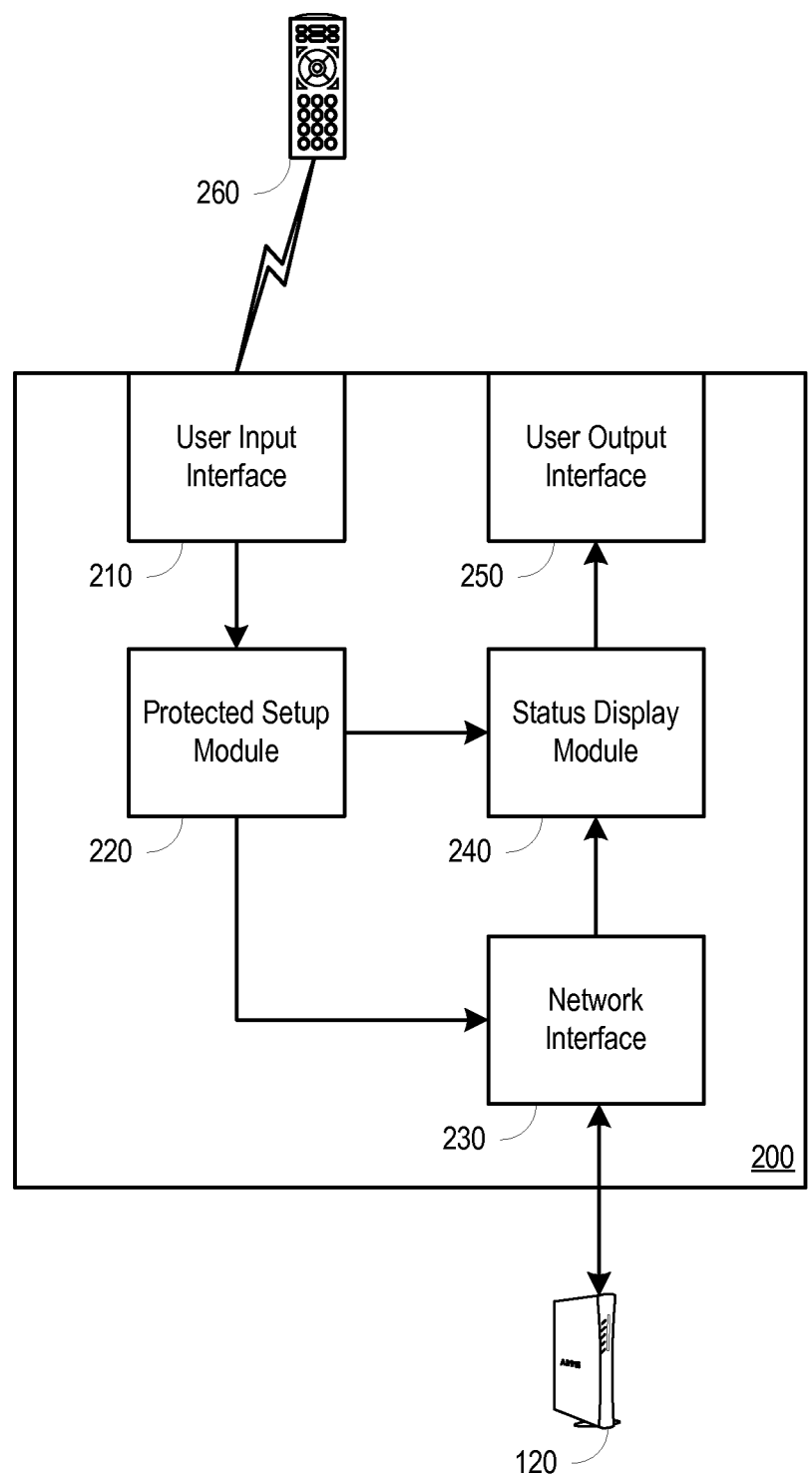
FIG. 2 is a block diagram illustrating an example component operable to facilitate the initiation and monitoring of a wireless connection between a station and an access point.

FIG. 2 is a block diagram illustrating an example component 200 operable to facilitate the initiation and monitoring of a wireless connection between a station and an access point. The component 200 can include a user input interface 210, a protected setup module 220, a network interface 230, a status display module 240, and a user output interface 250. In embodiments, the component 200 may be within a station 110 such as a STB.

In embodiments, the component 200 can receive, through the user interface 210, a predetermined input for initiating a wireless setup between a station 110 of FIG. 1 and an access point 120 of FIG. 1. The predetermined input sequence may be a specific order and/or duration of depressing one or more buttons. For example, the input can be received from a remote control 260, or can be input through physical buttons located on the station 110. The user interface 210 may include one or more receivers configured to receive signals from a remote control unit (e.g., radio frequency (RF) signals, infrared (IR) signals, etc.), wherein the received signals may allow the user interface 210 to recognize one or more depressed buttons at the remote control unit.

In embodiments, the protected setup module 220 can recognize a predetermined input for initiating a wireless setup when the predetermined input is received at the user input interface 210. When the predetermined input is recognized, the protected setup module 220 may cause a synchronization message (e.g., a message requesting parameters for establishing a communication channel between the station 110 and access point 120) to be output to the access point 120. The synchronization message may be output through the network interface 230.

In embodiments, the status display module 240 can monitor the status of a wireless setup between the station 110 and access point 120 through the network interface 230. For example, the status display module 240 can recognize various stages associated with the wireless setup, such as the setup initiating, a handshake initiating, a connection between the station 110 and access point 120 being established, and a successful or failed setup or handshake attempt.

In embodiments, the status display module 240 can output an indication of the wireless setup status to a user through the user output interface 250. For example, the user output interface 250 may include a display (e.g., dot matrix display, 7-segment, 9-segment, 14-segment, or 16-segment display, etc.) or one or more light indicators (e.g., light-emitting diode (LED) indicators).

In embodiments, where the user output interface 250 comprises a display, text and/or graphics indicating the various stages of the wireless setup between the station 110 and access point 120 can be output through the display (e.g., "Handshake Initiated," "Connecting," "Handshaking," "Success," etc.). In embodiments, where the user output interface 250 comprises light indicators (e.g., LED indicators), the various stages of the wireless setup between the station 110 and the access point 120 can be indicated based upon which of the one or more light indicators are illuminated and/or the frequency and/or duration at which the one or more light indicators are blinking.

Figure 3:
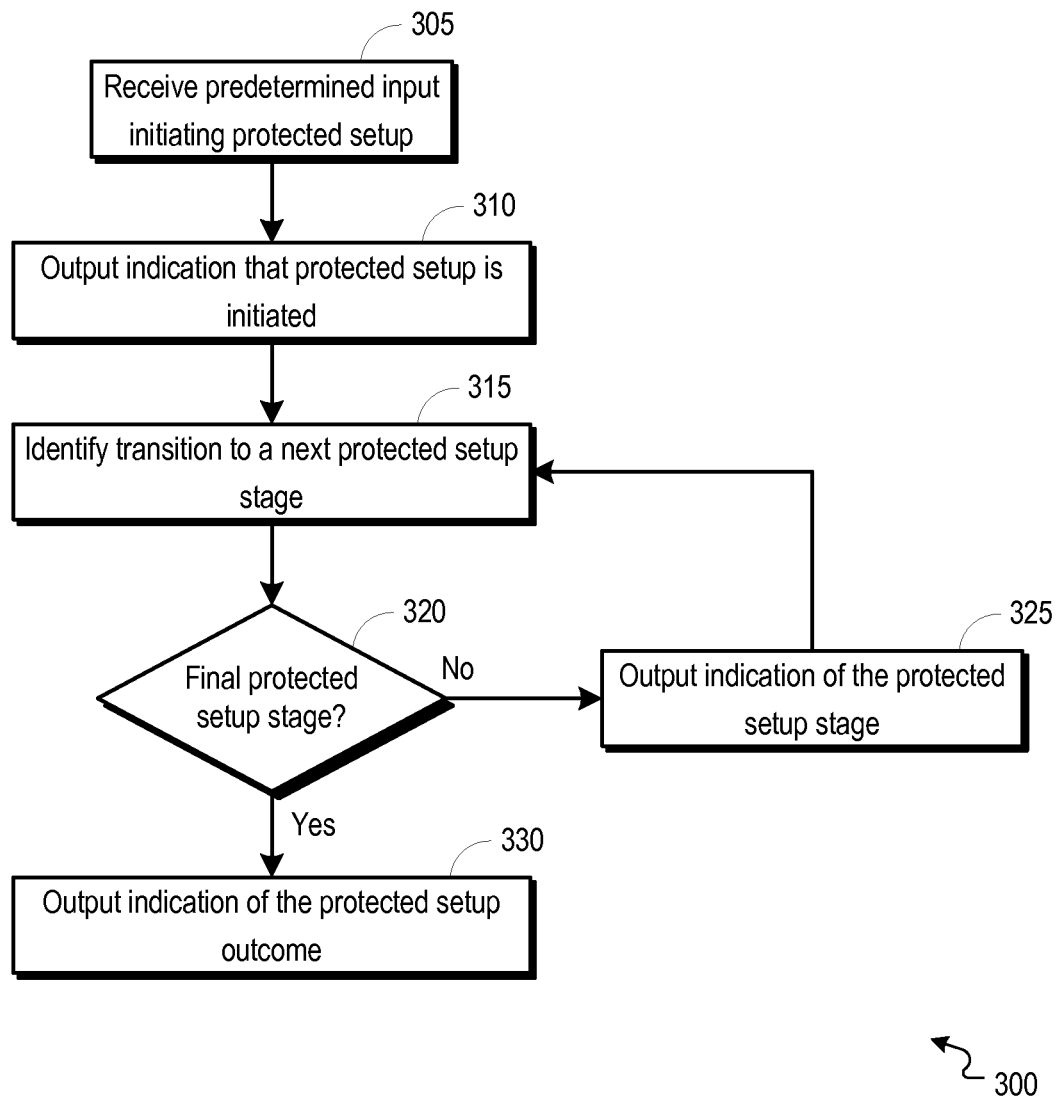
FIG. 3 is a flowchart illustrating an example process operable to facilitate the initiation and monitoring of a wireless connection between a station and an access point.

FIG. 3 is a flowchart illustrating an example process 300 operable to facilitate the initiation and monitoring of a wireless connection between a station 110 of FIG. 1 and an access point 120 of FIG. 1. The process 300 can begin at 305, when a predetermined input for initiating a protected setup between a station 110 and access point 120 is received at the station 110. When the predetermined input is received by the station 110, the protected setup between the station 110 and the access point 120 can be initiated. For example, a synchronization message can be output from the station 110 to the access point 120. In embodiments, the predetermined input may include a button sequence that can be defined within the station 110 static configuration file, and the button sequence can be recognized by the protected setup module 220 of FIG. 2. For example, the button sequence may be a predetermined order and/or duration of depressing one or more buttons at the station 110 or a remote control unit associated with the station 110.

At 310, an indication that a protected setup between the station 110 and access point 120 has been initiated can be output to a user. The protected setup initiation can be recognized, for example, by the status display module 240 of FIG. 2, and the indication can be output, for example, through the user output interface 250 of FIG. 2. The indication of the protected setup initiation may be a text display (e.g., text output at a digital display, dot matrix display, 7-segment, 9-segment, 14-segment, or 16-segment display, etc.) and/or an illumination of one or more indicators (e.g., lights, LEDs). For example, the station 110 may cause one or more indicator lights associated with the station 110 to blink at a specific frequency and/or for a specific period of time to indicate that the protected setup has been initiated.

At 315, a transition to a next stage in the protected setup process may be identified. A transition to a next stage may be identified, for example, by the status display module 240 of FIG. 2. Various stages of the protected setup process may include attempting to find an access point, outputting a synchronization message to an access point, receiving a synchronization message from an access point, receiving connection parameters from an access point, handshake stage, as well as other stages.

At 320, a determination may be made whether the identified protected setup stage is a final protected setup stage. The determination may be made, for example, by the status display module 240 of FIG. 2. In embodiments, a final protected setup stage may be a successful connection to an access point or a failed attempt to connect to the access point.

If, at 320, the determination is made that the identified protected setup stage is not a final protected setup stage, the process 300 may proceed to 325. At 325, an indication of the identified protected setup stage may be output to a user. The indication may be output, for example, through the user output interface 250 of FIG. 2. The indication of the protected setup stage may be a text display and/or an illumination of one or more indicators. For example, the station 110 may cause one or more indicator lights associated with the station 110 to blink at a specific frequency and/or for a specific period of time to indicate to the user the specific stage within which the protected setup process is operating.

After the indication of the protected setup stage is output to the user, the process 300 can identify a transition to a next protected setup stage at 315.

If, at 320, the determination is made that the identified protected setup stage is a final protected setup stage, the process 300 can proceed to 330. At 330, an indication of the final protected setup stage (e.g., protected setup success or protected setup failure) can be output to a user. The indication can be output, for example, through the user output interface 250 of FIG. 2. The indication of the protected setup stage may be a text display and/or an illumination of one or more indicators associated with a station 110. For example, one or more indicator lights can blink at a specific frequency and/or for a specific period of time to indicate to the user the outcome of the protected setup between the station 110 and access point 120. In embodiments, the one or more indicator lights can blink or can remain illuminated to indicate a successful or a failed protected setup between the station 110 and the access point 120.

Figure 4:
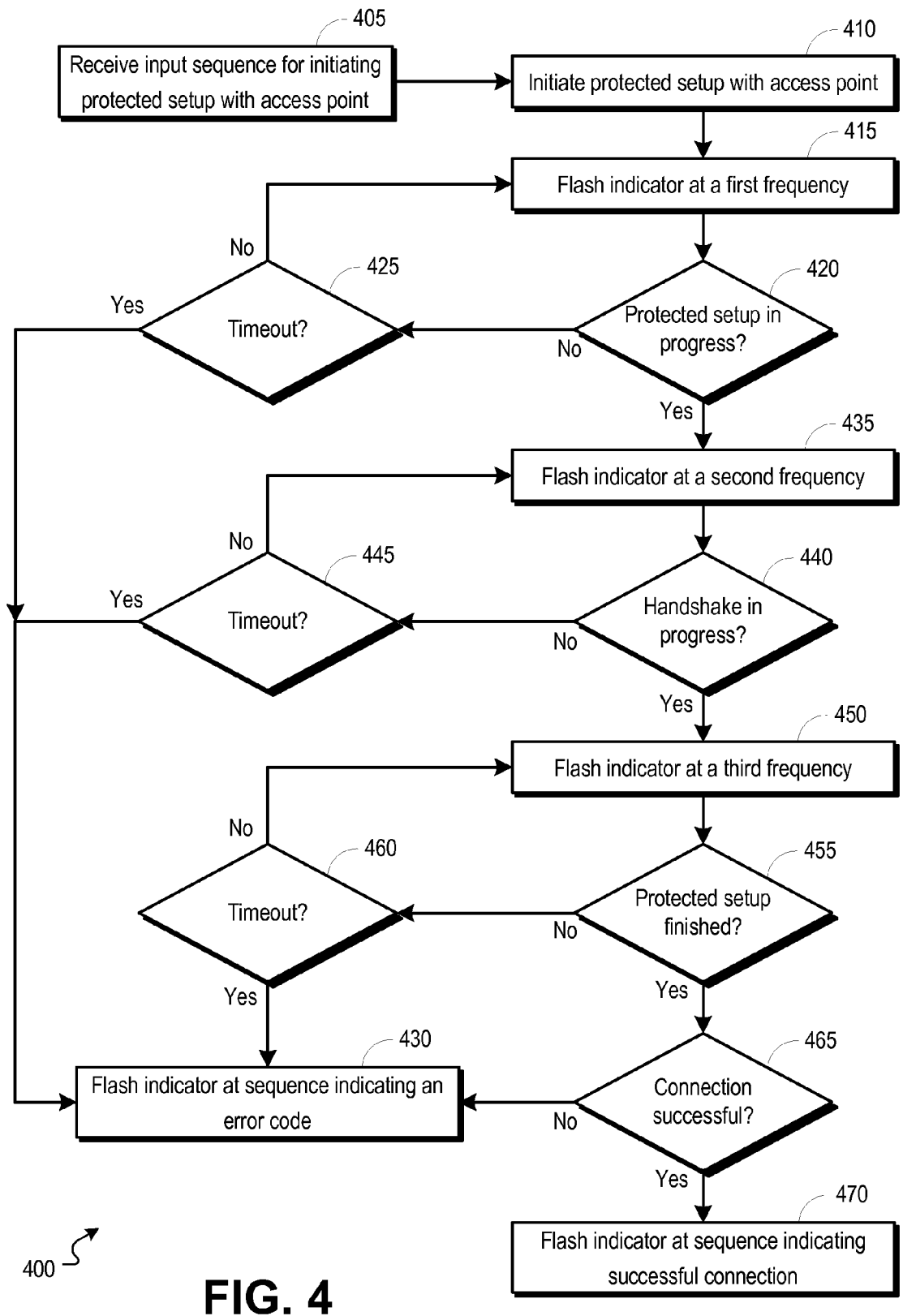
FIG. 4 is a flowchart illustrating an example process operable to facilitate the initiation and monitoring of a wireless connection between a station and an access point.

FIG. 4 is a flowchart illustrating an example process 400 operable to facilitate the initiation and monitoring of a wireless connection between a station 110 of FIG. 1 and an access point 120 of FIG. 1. The process 400 can begin at 405, when a predetermined input sequence for initiating a setup between a station 110 and access point 120 is received at the station 110. In embodiments, the input sequence may be a sequence of button depresses that can be defined within the station 110 static configuration file, and the sequence can be recognized by the protected setup module 220 of FIG. 2. For example, the sequence may be a predetermined order and/or duration of depressing one or more buttons at the station 110 or a remote control unit associated with the station 110.

At 410, a protected setup with the access point 120 may be initiated by the station 110. In embodiments, a synchronization message can be output from the station 110 to the access point 120. For example, initiation of the protected setup may include a scan of available wireless (e.g., Wi-Fi) channels, wherein the station 110 searches for an access point that is operating in a protected setup mode, and when the station 110 finds an appropriate access point, synchronization between the station 110 and access point may begin. The protected setup between the station 110 and access point 120 may include one or more steps associated with any of various methods for establishing a wireless connection between a station 110 and access point 120 (e.g., automated WPS that is operated by the press of a button, WPS operated by a shared key and/or passphrase, etc.).

At 415, one or more indicators at the station 110 may be flashed at a first frequency to provide an indication that a protected setup between the station 110 and access point 120 has been initiated by the station 110. The protected setup initiation can be recognized, for example, by the status display module 240 of FIG. 2, and the indication can be output, for example, through the user output interface 250 of FIG. 2. In embodiments, the user output interface 250 of FIG. 2 may include one or more indicators (e.g., lights, LEDs, etc.), and the status display module 240 may cause the one or more indicators to blink at a specific frequency and/or for a specific period of time, the specific frequency and/or specific period of time being unique to the initiation of a protected setup. For example, one or more indicators may flash at a first frequency of one (1) Hz for a duration of two (2) seconds to indicate that the protected setup has been initiated. It should be understood that a station 110 may be configured to use different frequencies and durations of indicator flashes to indicate the initiation of a protected setup.

At 420, the determination may be made whether the protected setup is in progress. The determination whether the protected setup is in progress may be made, for example, by the status display module 240 of FIG. 2. For example, the status display module 240 may recognize when the station 110 begins to scan wireless channels for an access point that is operating in a protected setup mode.

If, at 420, the determination is made that the protected setup is not in progress, the process 400 may proceed to 425. At 425, the determination may be made whether a timeout period associated with the protected setup initiation has ended. For example, a predetermined timeout period may be established for the initiation of a protected setup between a station 110 and access point 120. If the predetermined timeout period has not expired, the indicator may continue to be flashed at the first frequency at 415. If the protected setup has not begun within the predetermined timeout period, the determination may be made that the protected setup initiation has timed out and the process 400 may proceed to 430.

At 430, the indicator may be flashed at a sequence indicating an error code. In embodiments, the status display module 240 may identify an error occurring in the protected setup between the station 110 and the access point 120. The status display module 240 may be pre-configured with an association between specific sequences or frequencies of indicator blinks and various errors that might occur during the protected setup between a station 110 and access point 120. For example, a specific sequence of indicator blinks (e.g., unique frequency and/or duration of blinking indicator(s)) may be associated with each of a variety of error conditions that might arise (e.g., no access point found with which to connect, two or more stations attempting protected setup at the same time, additional access point attempting protected setup at the same time, connection failed, etc.). The status display module 240 may identify the error causing the protected setup to fail, and may output the corresponding indication (e.g., indicator blinking sequence) through the user output interface 250.

Returning to 420, if the determination is made that the protected setup is in progress, the process 400 may proceed to 435. At 435, one or more indicators at the station 110 may be flashed at a second frequency to provide an indication that a protected setup between the station 110 and access point 120 is in progress. In embodiments, the user output interface 250 of FIG. 2 may include one or more indicators (e.g., lights, LEDs, etc.), and the status display module 240 may cause the one or more indicators to blink at a specific frequency and/or for a specific period of time, the specific frequency and/or specific period of time being unique to the protected setup being in progress. The second frequency of indicator blinking associated with the protected setup being in progress may be greater than or less than the first frequency of indicator blinking associated with the initiation of the protected setup. For example, the frequency of one or more indicator flashes may be slightly increased from the first frequency to a second frequency (e.g., two (2) Hz as compared to the first frequency of one (1) Hz) to indicate that the protected setup is in progress. It should be understood that a station 110 may be configured to use different frequencies and durations of indicator flashes to indicate to a user that the protected setup is in progress.

At 440, the determination may be made whether a handshake between the station 110 and access point 120 is in progress. The determination whether a handshake between the station 110 and access point 120 is in progress may be made, for example, by the status display module 240 of FIG. 2. In embodiments, a handshake between the station 110 and access point 120 may include a key exchange process (e.g., pre-shared key (PSK)) whereby multiple key messages are exchanged between the station 110 and access point 120. The status display module 240 may determine that a handshake process between the station 110 and access point 120 has begun when a key message is recognized.

If, at 440, the determination is made that a handshake is not in progress, the process 400 may proceed to 445. At 445, the determination may be made whether a timeout period associated with the protected setup has ended. For example, a predetermined timeout period may be established for the protected setup between a station 110 and access point 120. If the predetermined timeout period has not expired, the indicator may continue to be flashed at the second frequency at 435. If the handshake between the station 110 and access point 120 has not begun within the predetermined timeout period, the determination may be made that the protected setup has timed out and the process 400 may proceed to 430.

If, at 440, the determination is made that the handshake between the station 110 and access point 120 is in progress, the process 400 may proceed to 450. At 450, one or more indicators at the station 110 may be flashed at a third frequency to provide an indication that a handshake between the station 110 and access point 120 is in progress. In embodiments, the user output interface 250 of FIG. 2 may include one or more indicators (e.g., lights, LEDs, etc.), and the status display module 240 may cause the one or more indicators to blink at a specific frequency and/or for a specific period of time, the specific frequency and/or specific period of time being unique to a handshake being in progress. The third frequency of indicator blinking associated with the handshake being in progress may be greater than or less than the second frequency of indicator blinking associated with the protected setup being in progress. For example, the frequency of one or more indicator flashes may be slightly increased from the second frequency to a third frequency (e.g., four (4) Hz as compared to the second frequency of two (2) Hz) to indicate that the handshake is in progress. It should be understood that a station 110 may be configured to use different frequencies and durations of indicator flashes to indicate to a user that the handshake is in progress.

At 455, the determination may be made whether a protected setup between the station 110 and access point 120 is finished. The determination whether a protected setup between the station 110 and access point 120 is finished may be made, for example, by the status display module 240 of FIG. 2. In embodiments, the protected setup sequence may be considered to be finished when a final key message has been received and when the key (PSK) associated with the access point 120 has been installed at the station 110, or when an error condition arises. The status display module 240 may determine that the protected setup sequence has finished when either an error condition is recognized or when confirmation is received that a final key message has been received and installed at the station 110.

If, at 455, the determination is made that the protected setup is not finished, the process 400 may proceed to 460. At 460, the determination may be made whether a timeout period associated with the protected setup has ended. For example, a predetermined timeout period may be established for the protected setup between a station 110 and access point 120. If the predetermined timeout period has not expired, the indicator may continue to be flashed at the third frequency at 450. If the protected setup between the station 110 and access point 120 has not finished within the predetermined timeout period, the determination may be made that the protected setup has timed out and the process 400 may proceed to 430.

If, at 455, the determination is made that the protected setup between the station 110 and access point 120 has finished, the process 400 may proceed to 465. At 465, the determination may be made whether the protected setup resulted in a successful connection between the station 110 and access point 120. In embodiments, the status display module 240 may identify a successful connection between the station 110 and the access point 120. Upon a successful connection with an access point 120, the station 110 may receive an acknowledgment message from the access point 120. If the determination is made that the protected setup did not result in a successful connection between the station 110 and access point 120, the process 400 may proceed to 430.

If, at 465, the determination is made that the protected setup resulted in a successful connection between the station 110 and access point 120, the process 400 may proceed to 470. At 470, the indicator may be flashed at a sequence indicating a successful connection between the station 110 and access point 120. In embodiments, the status display module 240 may be pre-configured with an association between a specific sequence of indicator blinks and a successful connection between a station 110 and access point 120. The status display module 240 may identify the successful connection, and may output the corresponding indication (e.g., indicator blinking sequence) through the user output interface 250. In embodiments, blinking of one or more indicators may be ceased, and one or more indicators may be lit continuously to indicate a successful connection between the station 110 and access point 120.

Figure 5:
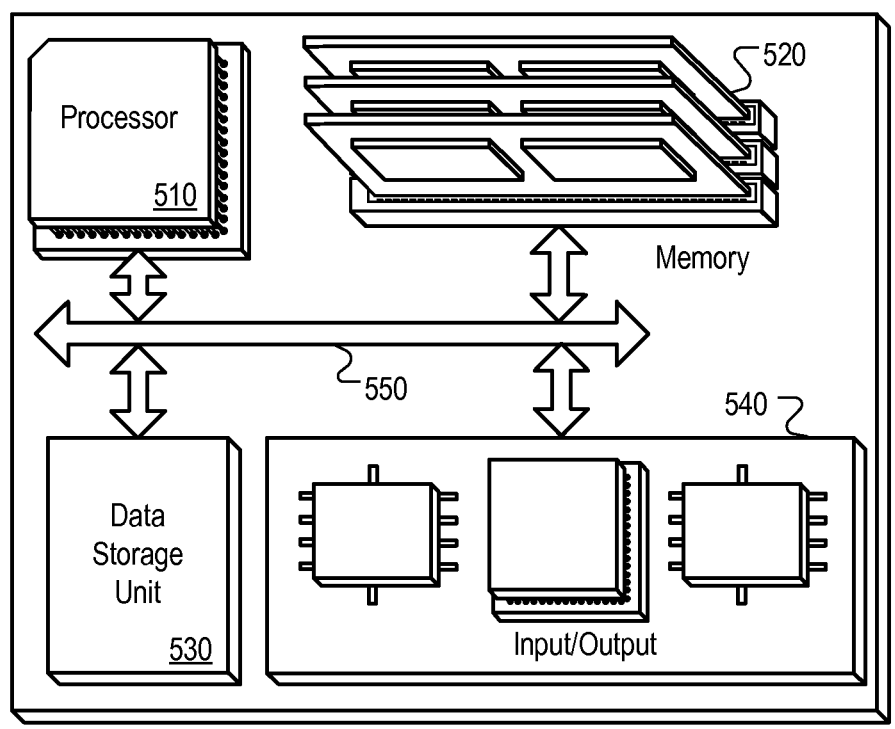
FIG. 5 is a block diagram of a hardware configuration operable to facilitate the initiation and monitoring of a wireless connection between a station and an access point.

FIG. 5 is a block diagram of a hardware configuration 500 operable to facilitate the initiation and monitoring of a wireless connection between a station and an access point. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point 120 of FIG. 1, cable modem, router, wireless extender, or other access device) or subscriber device (e.g, station 110 of FIG. 1, STB, etc.). In another implementation, the input/output device can include driver devices configured to send communications to, and receive communications from one or more networks (e.g., WAN 130 of FIG. 1, local network 140 of FIG. 1, etc.).

Those skilled in the art will appreciate that the invention improves upon methods and systems for initiating and monitoring a wireless connection between a station and an access point. Methods and systems are described herein for initiating a wireless setup between a station and an access point upon the station receiving a predetermined input from a user. Further, methods and systems are described herein for displaying to the user, the status of a wireless connection between the station and an access point. The methods and systems described herein allow a user to initiate and monitor a wireless setup between a station and an access point without having to connect a display device to the station.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a predetermined input at a set-top box, wherein the predetermined input signals an initiation of a protected setup between the set-top box and an access point;
   initiating a protected setup process, wherein the protected setup process comprises a plurality of stages;
   during each respective stage of the plurality of stages of the protected setup process, outputting, at the set-top box, a visual indication associated with the respective stage, wherein the visual indication associated with each respective stage of the protected setup process comprises a frequency at which a light indicator associated with the set-top box is blinking, wherein the frequency at which the light indicator is blinking is unique to the respective stage;
   determining whether the protected setup process resulted in a successful connection between the set-top box and the access point;
   outputting, at the set-top box, a visual indication associated with the result of the protected setup process; and
   if the protected setup process does not result in a successful connection between the set-top box and the access point, identifying a cause of the unsuccessful connection, wherein the visual indication associated with the result of the protected setup process comprises a sequence of blinking one or more light indicators associated with the set-top box, the sequence being associated with the identified cause of the unsuccessful connection.

2. The method of claim 1, wherein the predetermined input comprises a sequence of depressing one or more buttons.

3. The method of claim 2, wherein the buttons are physically located at the set-top box.

4. The method of claim 2, wherein the buttons are associated with a remote control unit.

5. The method of claim 1, wherein the visual indication associated with each respective stage of the protected setup process comprises text output at a display physically located at the set-top box.

6. A set-top box comprising:
   a first interface configured to be used to receive a predetermined input, wherein the predetermined input signals an initiation of a protected setup with an access point;
   a module configured to:
      initiate a protected setup process, wherein the protected setup process comprises a plurality of stages; and
      determine whether the protected setup process results in a successful connection with the access point; and
   a second interface configured to be used to:
      during each respective stage of the plurality of stages of the protected setup process, output a visual indication associated with the respective stage, wherein the visual indication associated with each respective stage of the protected setup process comprises a frequency at which a light indicator associated with the set-top box is blinking, wherein the frequency at which the light indicator is blinking is unique to the respective stage; and
      output a visual indication associated with the result of the protected setup process; and
   wherein the module is further configured to identify a cause of the unsuccessful connection if the protected setup process does not result in a successful connection with the access point, wherein the visual indication associated with the result of the protected setup process comprises a sequence of blinking one or more light indicators associated with the set-top box, the sequence being associated with the identified cause of the unsuccessful connection.

7. The set-top box of claim 6, wherein the first interface comprises one or more buttons, and the predetermined input comprises a sequence of depressing one or more of the buttons.

8. The set-top box of claim 6, wherein the first interface comprises one or more receivers, and the predetermined input comprises a sequence of depressing one or more buttons associated with a remote control unit, the depressing of the one or more buttons being recognized by the one or more receivers.

9. The set-top box of claim 6, wherein the second interface comprises one or more displays, and the visual indication associated with each respective stage of the protected setup process comprises text.

10. One or more non-transitory computer readable media having instructions operable to cause one or more processors to perform the operations comprising:
receiving a predetermined input at a set-top box, wherein the predetermined input signals an initiation of a protected setup between the set-top box and an access point;
initiating a protected setup process, wherein the protected setup process comprises a plurality of stages;
during each respective stage of the plurality of stages of the protected setup process, outputting, at the set-top box, a visual indication associated with the respective stage, wherein the visual indication associated with each respective stage of the protected setup process comprises a frequency at which a light indicator associated with the set-top box is blinking, wherein the frequency at which the light indicator is blinking is unique to the respective stage;
determining whether the protected setup process resulted in a successful connection between the set-top box and the access point;
outputting, at the set-top box, a visual indication associated with the result of the protected setup process; and
if the protected setup process does not result in a successful connection between the set-top box and the access point, identifying a cause of the unsuccessful connection, wherein the visual indication associated with the result of the protected setup process comprises a sequence of blinking one or more light indicators associated with the set-top box, the sequence being associated with the identified cause of the unsuccessful connection.

11. The one or more non-transitory computer-readable media of claim 10, wherein the predetermined input comprises a sequence of depressing one or more buttons.

12. The one or more non-transitory computer-readable media of claim 11, wherein the buttons are physically located at the set-top box.

13. The one or more non-transitory computer-readable media of claim 11, wherein the buttons are associated with a remote control unit.

14. The one or more non-transitory computer-readable media of claim 10, wherein the visual indication associated with each respective stage of the protected setup process comprises text output at a display physically located at the set-top box.

* * * * *